United States Patent
Gebre et al.

(10) Patent No.: US 12,051,958 B2
(45) Date of Patent: Jul. 30, 2024

(54) MAGNETICALLY COUPLED BALL DRIVE FOR ACTUATION OF SPHERICAL SURFACES

(71) Applicant: THE TRUSTEES OF THE STEVENS INSTITUTE OF TECHNOLOGY, Hoboken, NJ (US)

(72) Inventors: Biruk Assefa Gebre, North Bergen, NJ (US); Kishore Pochiraju, Belmar, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 1018 days.

(21) Appl. No.: 16/929,982

(22) Filed: Jul. 15, 2020

(65) Prior Publication Data

US 2021/0021188 A1 Jan. 21, 2021

Related U.S. Application Data

(60) Provisional application No. 62/874,481, filed on Jul. 15, 2019, provisional application No. 62/874,404, filed on Jul. 15, 2019.

(51) Int. Cl.

| | |
|---|---|
| *H02K 49/10* | (2006.01) |
| *B60B 19/00* | (2006.01) |
| *B60B 19/14* | (2006.01) |
| *B62D 11/00* | (2006.01) |
| *B62D 11/04* | (2006.01) |

(52) U.S. Cl.
CPC ......... *H02K 49/102* (2013.01); *B60B 19/006* (2013.01); *B60B 19/14* (2013.01); *B62D 11/003* (2013.01); *B62D 11/04* (2013.01); *H02K 2201/18* (2013.01)

(58) Field of Classification Search
CPC .............. H02K 2201/18; H02K 49/102; B60B 19/006; B60B 19/04; B62D 11/003
See application file for complete search history.

(56) References Cited

U.S. PATENT DOCUMENTS

| | | | |
|---|---|---|---|
| 8,028,775 B2* | 10/2011 | Orenbuch | B60B 19/12 180/7.1 |
| 9,528,344 B2* | 12/2016 | Vick, Jr. | E21B 34/06 |
| 2010/0243342 A1* | 9/2010 | Wu | B62D 57/00 180/9.1 |
| 2015/0224941 A1* | 8/2015 | Bernstein | B62D 61/00 180/21 |
| 2016/0339742 A1* | 11/2016 | Libakken | B60B 33/0015 |

(Continued)

OTHER PUBLICATIONS

Özgür, Ayberk et al., Permanent Magnet-Assisted Omnidirectional Ball Drive. International Conference on Intelligent Robots and Systems (IROS), (Oct. 2016). Daejeon, Korea.

*Primary Examiner* — Tony H Winner
(74) *Attorney, Agent, or Firm* — Clark Hill PLC; Ralph W. Selitto; John K. Kim

(57) ABSTRACT

A magnetically coupled ball drive system for actuation of spherical surfaces and wheels is disclosed. An internal support structure interacts with exterior drive wheels magnetically to produce rotational motion. A related improvement involving reduction of slip due to insufficient traction is also presented to establish a design for a more robust and versatile device that can be used in robotics or for producing vehicle locomotion.

21 Claims, 14 Drawing Sheets

(56) References Cited

U.S. PATENT DOCUMENTS

| | | | |
|---|---|---|---|
| 2016/0375723 A1* | 12/2016 | Jochim | B60B 19/12 |
| | | | 280/30 |
| 2017/0239982 A1* | 8/2017 | Fontaine | B60C 11/00 |
| 2017/0267025 A1* | 9/2017 | Yu | B60B 33/08 |
| 2018/0022197 A1* | 1/2018 | Bewley | B60B 19/14 |
| | | | 180/21 |
| 2018/0099525 A1* | 4/2018 | Kim | A63B 43/04 |
| 2019/0097513 A1* | 3/2019 | Kim | H02P 6/16 |
| 2019/0099525 A1* | 4/2019 | Anzai | A61L 29/085 |

* cited by examiner

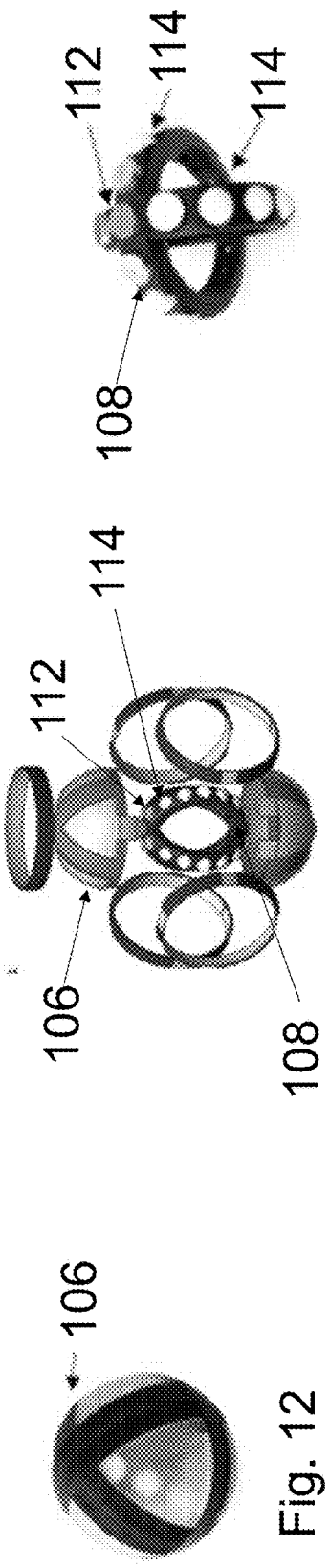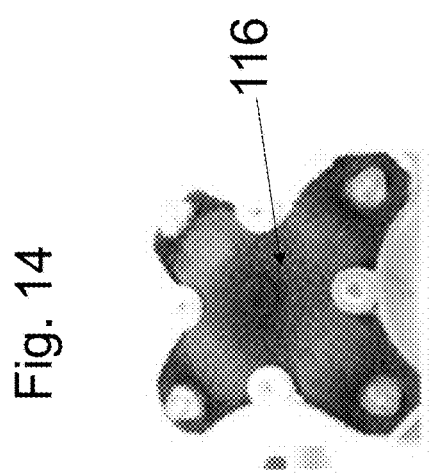

MAGNETICALLY COUPLED BALL DRIVE FOR ACTUATION OF SPHERICAL SURFACES

This patent application claims priority from U.S. Provisional Application Ser. No. 62/874,404, filed Jul. 15, 2019, the disclosure of which is incorporated herein by reference in its entirety. This patent application also claims priority from U.S. Provisional Application Ser. No. 62/874,481, filed Jul. 15, 2019, the disclosure of which is incorporated herein by reference in its entirety.

FIELD OF THE INVENTION

The present disclosure relates to spherical wheels and a driving mechanism therefor. More particularly, a system and method for effective magnetic coupling of spherical wheels to the remainder of a chassis is disclosed along with a general framework for minimizing slip and maximizing traction force in such systems.

BACKGROUND OF THE INVENTION

Spherical wheels are a relatively new and emerging method of locomotion that enables substantial freedom of motion for mobile ground robots, for example. As the utility and confidence in wheeled mobile robots continue to increase, the use of spherical wheel-based systems is also expanding into new environments and applications.

Mobile robotic platforms navigating in unstructured and dynamic environments greatly benefit from unconstrained omnidirectional locomotion. Ground robots with spherical wheels (i.e., ball-driven robots) can enable agile omnidirectional mobility over a wide range of ground terrains. Implementation of ball drives can, however, be challenging as the entire surface of the spherical wheel needs to be accessible to enable omnidirectional ground traversal and motion. Moreover, occurrence of slip at the contact surface between the wheel, the drive mechanism, and ground decreases actuation performance, especially during rapid vehicle acceleration and navigation on graded terrains, and may result in motion errors.

Traditionally, an external support frame for spherical wheels has been used to connect one or more spherical wheels to a chassis (i.e., platform). However, in addition to problems related to slip (e.g., abrasion of the wheel, motion errors), contact points between the wheel and an external frame can become contaminated with debris, causing jamming and degradation of performance of the system.

While past designs include some using magnetic induction for actuation, as well as those using permanent magnets as drive wheel, such implementations still require external support structures that are unreliable for long-term use and require frequent maintenance. Existing ball drives that use traction forces are also limited in the amount of traction they can apply before slip occurs, while ball drives that use magnetic induction have very low actuation efficiencies.

SUMMARY OF THE INVENTION

This summary is a high-level overview of various aspects of the disclosure and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Some embodiments of the present specification relate to a ball drive system, comprising: an external yoke; a first pair of drive wheels mounted on the external yoke; a spherical wheel comprising an internal support structure; and a magnetic coupler coupling the internal support structure of the spherical wheel to the first pair of drive wheels via a controllable magnetic force, wherein the first pair of drive wheels is configured to actuate the spherical wheel along a first degree of freedom.

In some embodiments, a second pair of drive wheels are mounted on the external yoke orthogonally to the first pair of drive wheels, wherein the second pair of drive wheels is configured to actuate the spherical wheel along a second degree of freedom.

In some embodiments, the magnetic coupler comprises at least one pair of permanent magnets, wherein a first magnet of the pair of magnets is positioned on the external yoke and a second magnet of the pair of magnets is positioned on the internal support structure.

In some embodiments, the magnetic coupler is a magnetic coupler array (MCA) comprising an array of magnets positioned on the external yoke and the internal support structure.

In some embodiments, the magnetic coupler comprises Ferromagnetic materials.

In some embodiments, the magnetic coupler is an alternating MCA.

In some embodiments, the magnetic coupler is a collinear MCA.

In some embodiments, the magnetic coupler is a Halbach MCA.

In some embodiments, the drive wheels are Omni-wheels.

In some embodiments, the system further comprises an air gap between the surfaces of the cylindrical magnets and the spherical wheel.

In some embodiments, the air gap is configured to be adjusted to control the magnetic coupling force.

In some embodiments, the MCA is supplemented with electromagnets to control the controllable magnetic coupling force.

In some embodiments, the spherical wheel comprises an inner layer, a middle layer and an outer layer, each of the inner layer, the middle layer and the outer layer comprising a different hardness level.

In some embodiments, the internal support structure comprises at least one ball transfer.

In some embodiments, the internal support system comprises at least one cavity for mounting the at least one ball transfer.

In some embodiments, at least one ball transfer comprises Stainless Steel.

In some embodiments, the internal support structure comprises Acrylonitrile butadiene styrene.

In some embodiments, the magnetic coupler comprises at least one pair of attractive magnets and at least one pair of repulsive magnets.

In some embodiments, the repulsive magnets are positioned along the equator of the spherical wheel.

In some embodiments, the system further comprises a second pair of drive wheels positioned on the internal support system, wherein the second pair of drive wheels is magnetically coupled to the first pair of drive wheels.

In some embodiments, the second pair of drive wheels comprise Omni-wheels.

In some embodiments, the system includes Omni-tracks/chains in lieu of Omni-wheels.

BRIEF DESCRIPTION OF THE DRAWINGS

Some embodiments of the present disclosure are herein described, by way of example only, with reference to the accompanying drawings. With specific reference now to the drawings in detail, particulars shown are by way of example and for purposes of illustrative discussion of the embodiments of the invention. In this regard, the description taken with the drawings makes apparent to those skilled in the art how embodiments of the disclosure may be practiced.

FIG. 12 shows a perspective view of an assembled spherical wheel with an internal support structure, according to some embodiments of the present disclosure;

FIG. 13 shows an exploded perspective view of a spherical wheel, according to some embodiments of the present disclosure;

FIG. 14 shows a perspective view of an internal support structure, according to some embodiments of the present disclosure;

FIG. 15 shows a bottom view of an alternating magnetic coupler array (MCA), according to some embodiments of the present disclosure;

FIG. 16 shows a top view of an alternating MCA housing, according to some embodiments of the present disclosure;

FIG. 17 shows a perspective view of iron filing used to show magnetic field lines for an alternating MCA, according to some embodiments of the present disclosure;

DETAILED DESCRIPTION OF EXEMPLARY EMBODIMENTS

Figure 1:
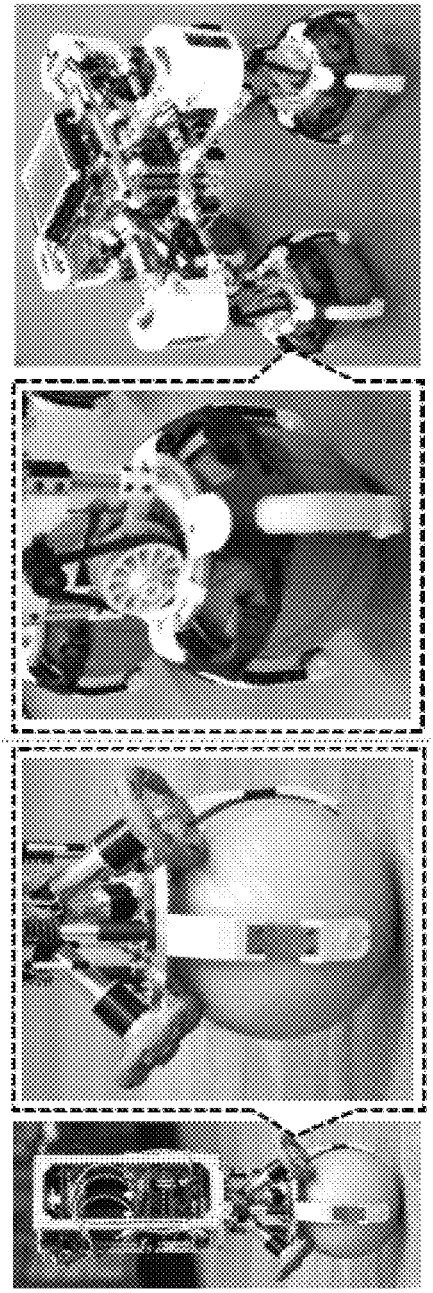
FIG. 1 shows a perspective view of two different prior art ball drive systems.
Figure 2:
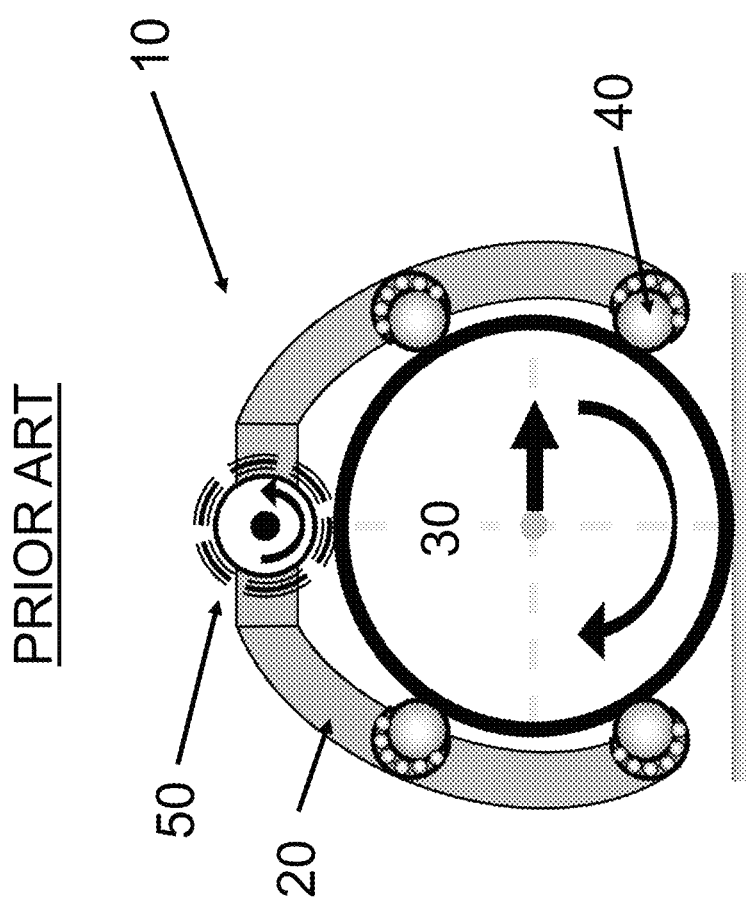
FIG. 2 shows a schematic view of a prior art ball drive with an external support structure.

The following description of the preferred embodiment(s) is merely exemplary in nature and is in no way intended to limit the invention, its application, or uses. As used throughout, ranges are used as shorthand for describing each and every value that is within the range. Any value within the range can be selected as the terminus of the range. In the event of a conflict between a definition in the present disclosure and that of a cited reference, the present disclosure prevails.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention.

The present disclosure, and embodiments thereof, relates to a magnetically coupled ball drive (MCBD) and related methods which improve on actuation efficiency and reliability of existing ball drives. In an embodiment, an external yoke securely holds a spherical wheel using an adjustable magnetic force, enabling the application of large traction forces for accurate omnidirectional actuation of the spherical wheel or surface. In some embodiments, a controllable magnetic force applied from the center of the external yoke is used to couple a wheel having an internal support structure, with permanent magnets or ferromagnetic materials, to a chassis. In some embodiments, omnidirectional drive wheels and a second magnet array pair located outside of the spherical wheel are used to drive and couple the spherical wheel to the vehicle chassis. In some embodiments the internal support structure, Omni-wheels, and magnetic coupling force perform the function of an omnidirectional axel for the spherical wheel and enable traction control for actuation. In addition to coupling the spherical wheel to the Omni-wheels, in some embodiments, the controllable magnetic force can also be adjusted to control the maximum traction forces that can be applied from the Omni-wheel to the spherical wheel, and from the spherical wheel to the ground.

In some embodiments, the internal support structure increases the mass of the spherical wheel. However, the rotational inertia of the spherical wheel does not increase as the magnetic force keeps the internal support structure coupled to the yoke. The increase in mass has the added benefit of lowering the center of gravity of a platform, or other fixture supported by the wheel and chassis assembly. Using an internal support structure also exposes more of the exterior surface of the spherical wheel, which enables easier traversal of ground obstacles and terrain.

The present disclosure overcomes many problems associated with most conventional ball drives possessing an external support structure that encases the spherical wheel and affixes it to the chassis of the vehicle. For instance, if ball transfer units make up the contact points to transfer forces between the external support structure and the spherical wheel, during motion, dust and debris that is picked up on the surface of the spherical wheel transfers onto the surface of the ball-transfer units, contaminates the internal components of the ball-transfer units, increases the rolling resistance of the ball-transfer units, and eventually causes them to jam. These issues are obviated by eliminating the external support structure in favor of an internal support structure in the present invention.

The MCBD internal support structure of the present disclosure is placed inside the spherical wheel to affix the wheel to the chassis of a vehicle, robot, platform or other device via magnetic force. As such, the MCBD's ball-transfer units are shielded from dust, debris, or other contaminants and can operate with very little rolling resistance for long durations, without the need for frequent maintenance.

A second problem addressed by the present invention is the loss of traction that can occur during high torque/high acceleration maneuvers. Slip occurs between the Omni-wheel and the spherical wheel during motion that requires the application of high traction forces, or during instances where the normal force being applied to the drive wheel is low. Slip also occurs when the applied traction force between an Omni-wheel and a spherical wheel exceeds the Coulomb static friction force. Even when using material combinations with high friction coefficients, loss of traction can still occur if insufficient normal force is present at the contact point, such as instances in which there is a shift in weight distribution during motion, or if large traction forces are needed when traversing up an incline. The MCBD of the present invention addresses the slippage problem by offering the capability of adjusting the magnetic coupling force, whereby the MCBD functions to control the traction forces that can be applied during actuation. In other words, the MCBD of the present invention enables control of the normal force between the Omni-wheels and the spherical wheel as the magnetic force used to couple the spherical wheel to the chassis can be adjusted. This capability of the present invention allows for control of the forces that can be generated for actuating the spherical wheel during motion, which enables the MCBD to be used for a wide range of operating conditions while minimizing the occurrence of slip.

One novelty of the present MCBD system is the elimination of a troublesome external support structure, used in conventional ball drives, that rolls along the interior surface of a spherical wheel.

Figure 3:
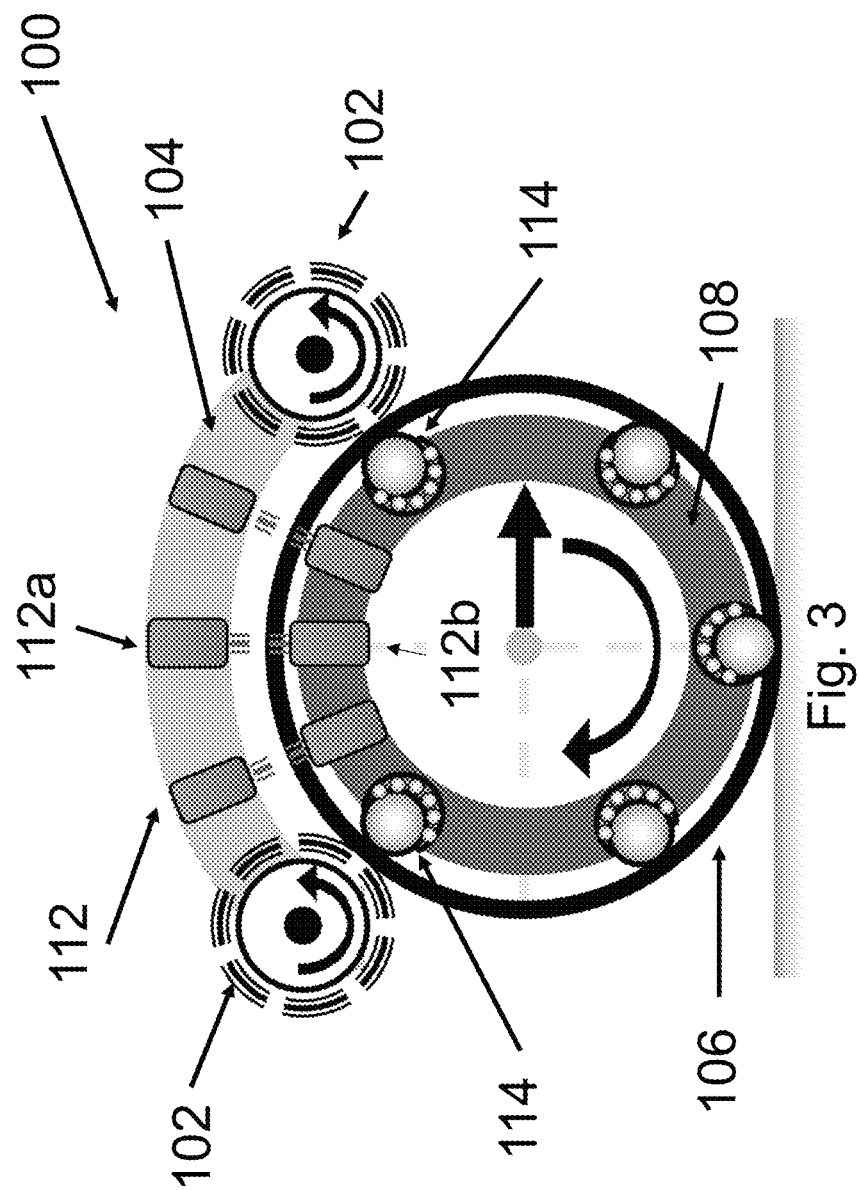
FIG. 3 shows a simplified schematic view of a magnetically coupled ball drive (MCBD) system, according to some embodiments of the present disclosure.
Figure 24:
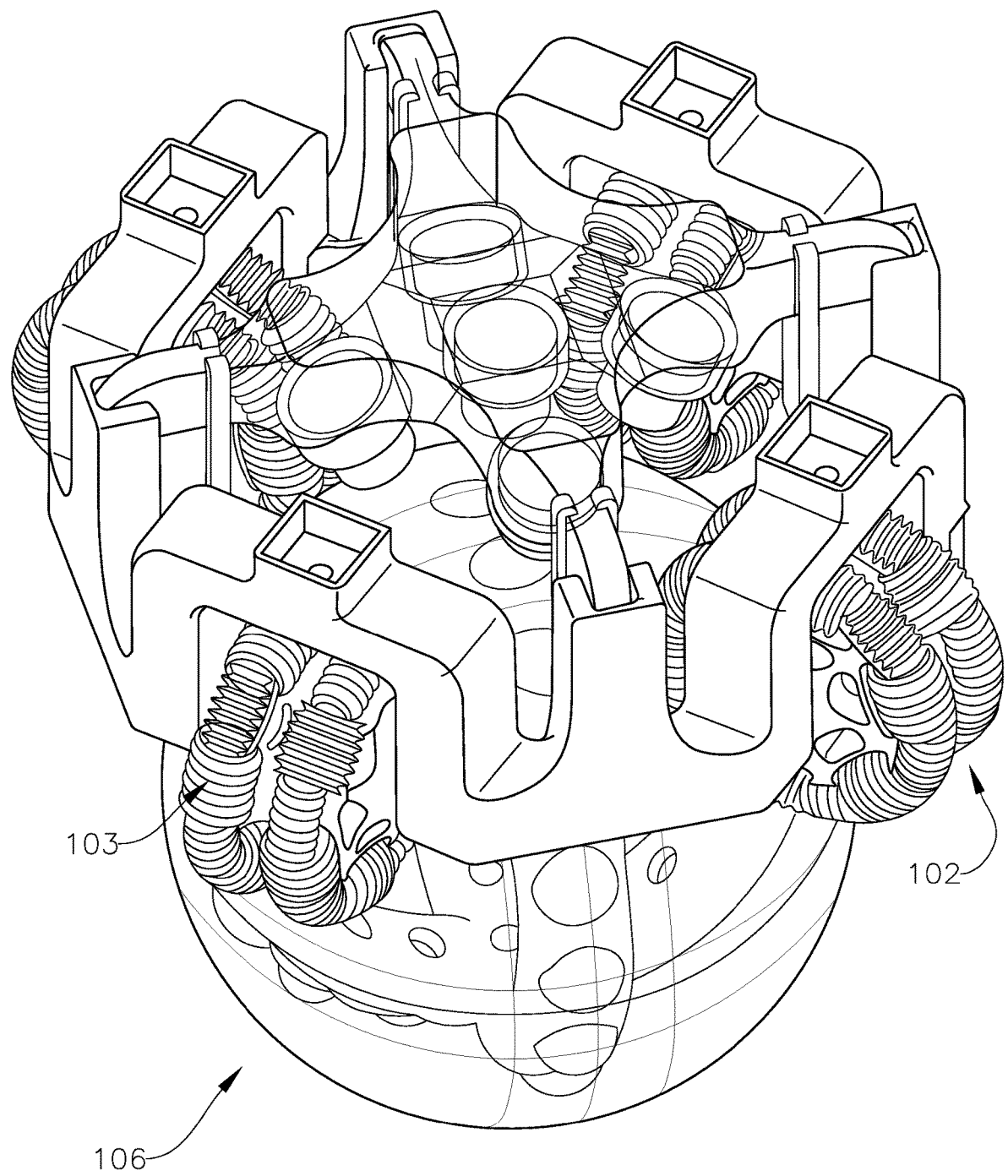
FIG. 24 is a top perspective view of an MCBD system in accordance with an embodiment of the present invention, illustrating two pairs of drive wheels.

In an embodiment, a MCBD system 100, depicted in FIG. 3, includes a pair of Omni-wheels 102 mounted on an external yoke 104. In some embodiments, the Omni-wheels 102 are used to actuate a spherical wheel 106 along a tangential direction. In some embodiments, a second pair of Omni-wheels 103 (see FIG. 24) may be orthogonally mounted on the external yoke 104, and can be driven to actuate the spherical wheel 106 along a second degree of freedom (e.g., orthogonal motion). In other embodiments, the MCBD system 100 is not limited to two pairs of Omni-wheels but may include any number of Omni-wheels. As depicted in FIG. 3, in some embodiments, the spherical wheel 106 includes an internal support structure 108. In some embodiments, the internal support structure 108 includes at least one ball transfer 114 positioned thereon. The ball transfers 114 are physically mounted to the internal support structure 108. In some embodiments, the MCBD system 100 further includes a magnetic coupler configured to couple the spherical wheel 106 to the external yoke 104 via a controllable magnetic force FM. In the embodiment of FIG. 3, the magnetic coupler includes a pair of permanent magnets 112. However, in some embodiments, the magnetic coupler includes an array of permanent magnets 112, as will be later described in further detail. As used herein, the term "controllable magnetic force" means magnetic force directed by a set of the permanent magnets 112. A first magnet 112a of the pair of magnets is positioned on the external yoke 104, and a second magnet 112b of the pair of magnets is positioned on the internal support structure 108. A ferromagnetic material can also be used in place of the second magnet 112b. In some embodiments, in addition to coupling the spherical wheel 106 to the Omni-wheels (not shown), a controllable magnetic force FM applied from the center of the external yoke 104 is used to couple an internal support structure 108 to a chassis 110. The magnetic force can be adjusted by controlling the coupling distance between the magnets or by supplementing the magnets with electromagnets. Specifically, in some embodiments, the controllable magnetic force FM can be adjusted to vary the normal force between the Omni-wheels 102 and the spherical wheel 106, whereby the maximum traction forces that can be applied from the Omni-wheels 102 to the spherical wheel 106, and from the spherical wheel 106 to the ground, can be controlled, as indicated above. The internal support structure 108, the Omni-wheels 102, and the controllable magnetic force FM, therefore, in some embodiments, work together to function as an omnidirectional axel for the spherical wheel 106. These adaptations enable the MCBD system of the present disclosure to be used for a wide range of operating conditions, as indicated above.

Many design advantages are achieved by eliminating an external support structure and utilizing an internal support structure in its place. First, the points of contact between the internal support structure 108 and the spherical wheel 106 are shielded from external dust and debris picked up on the exterior surface of the spherical wheel 106 (the bearing surfaces of the Omni-wheels 102 are not directly exposed to the surface of the spherical wheel 106 and safely remain on the exterior of the MCBD system 100 without the risk of contamination). Because the internal support structure 108 and the spherical wheel 106 are shielded from external dust and debris, lubricated ball transfers 114 can be used, in some embodiments, which minimizes friction and rolling resistance at the contact points and improves the reliability of the MCBD system 100.

A second advantage of the present MCBD system 100 is that the controllable magnetic force FM increases the normal force applied to the Omni-wheels, which allows for the transmission of higher traction forces.

Example Parametrized Dynamic Model

Figure 4:
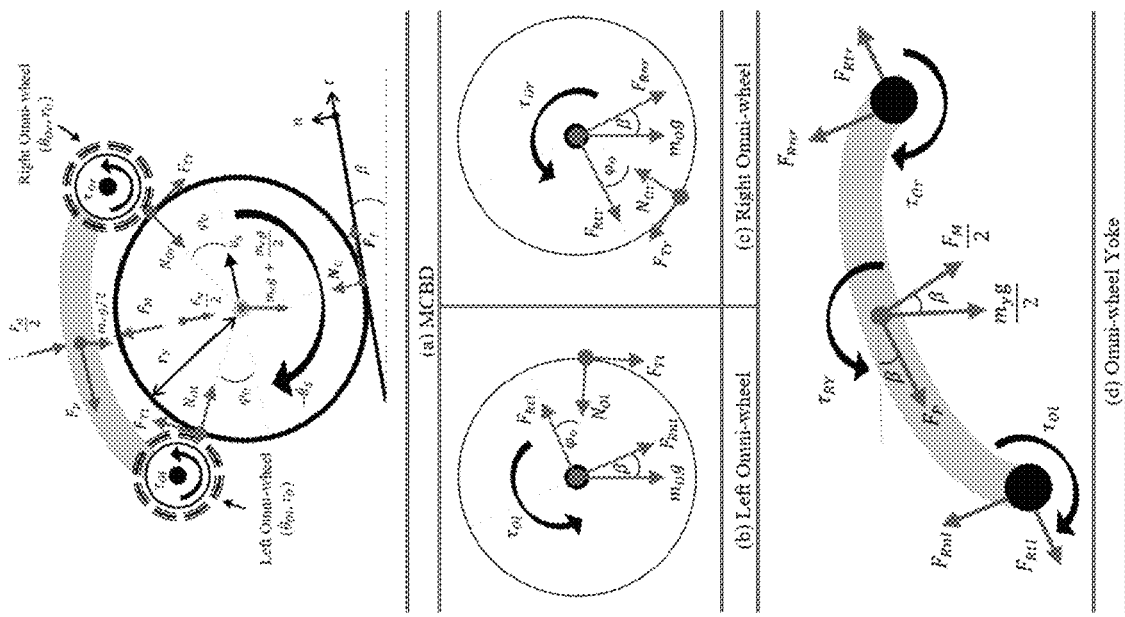
FIG. 4 shows a free body diagram for a simplified 2D model of the MCBD system of FIG. 3, according to some embodiments of the present disclosure.

In an embodiment, simplified 2D model was created to evaluate an exemplary no-slip design space of the proposed MCBD concept. The free-body diagrams shown in FIG. 4 are exemplary diagrams used to derive 12 force and moment balance equations (A.1-A.12) shown below, assuming a no-slip condition between the Omni-wheels, spherical wheel, and the ground.

Yoke $$F_{Rtl} - (m_y g/2)\sin(\beta) + F_{Rtr} - F_P = -m_Y r_s \alpha \tag{A.10}$$

$$F_{Rnl} - (m_y g/2)\cos(\beta) + F_{Rnr} + F_M/2 = 0 \tag{A.11}$$

$$[F_{Rnr} - F_{Rnl}](1-\sin(\varphi_o)) + (F_{Rtr} - F_{Rtl})\cos(\varphi_o)](r_z + r_o) - \tau_{ol} - \tau_{or} + \tau_{RY} = 0 \tag{A.12}$$

Spherical Wheel $$(F_{Ti} + F_{Tr})\sin(\varphi_0) + (N_{0i} - N_{0r})\cos(\varphi_0) + F_F - \left[m_2 + \frac{m_y}{2}\right]g\,\sin(\beta) = -m_s r_s \alpha \tag{A.1}$$

$$(F_{Ti} + F_{Tr})\cos(\varphi_0) + (N_{0i} - N_{0r})\sin(\varphi_0) + N_0 + \frac{F_R}{2} - \left[m_2 + \frac{m_y}{2}\right]g\,\cos(\beta) = 0 \tag{A.2}$$

$$(F_F - F_{Ti} - F_{Tr})r_s = -I_s \alpha \tag{A.3}$$

Left Omni-Wheel $$-F_{Ti}\sin(\varphi_0) - N_{Oi}\cos(\varphi_O) + F_{Ril} - m_O g\sin(\beta) = -m_{Oi} r_s \alpha \tag{A.4}$$

$$N_{Oi}\sin(\varphi_O) - F_{Rni} - F_{Ti}\cos(\varphi_O) - m_O g\cos(\beta) = 0 \tag{A.5}$$

$$\tau_{Oi} - F_{Ti} r_O = -\frac{I_O r_s \alpha}{r_O} \tag{A.6}$$

Right Omni-Wheel $$-F_{Tr}\sin(\varphi_O) - N_{Or}\cos(\varphi_O) + F_{Rtr} - m_O g\sin(\beta) = -m_{Or} r_s \alpha \tag{A.7}$$

$$N_{Or}\sin(\varphi_O) - F_{Rnr} - F_{Tr}\cos(\varphi_O) - m_O g\cos(\beta) = 0 \tag{A.8}$$

$$\tau_{Or} - F_{Tr} r_O = -\frac{I_O r_s \alpha}{r_O} \tag{A.9}$$

Table 1 defines the variables used in the following equations. Slip between the Omni-wheels and the spherical wheel occurs when the traction forces for the left or the right Omni-wheel exceeds the Coulomb static friction force (i.e., |FTl|>μOSNOl or |FTr|>μOSNOr). Slip functions for the left and right Omni-wheels are defined as equations (1) and (2) respectively, and the no-slip condition between the Omni-wheels and the spherical wheel (OS) is defined as equation (3).

$$Slip_{OSl} = |F_{Tl}|/\mu_{OS} N_{Ol} \tag{1}$$

$$Slip_{OSr} = |F_{Tr}|/\mu_{OS} N_{Or} \tag{2}$$

$$OS_{ns} = 0 \leq Slip_{OSl} < 1 \wedge 0 \leq Slip_{OSr} < 1 \tag{3}$$

Similarly, the slip function between the spherical wheel and the ground (SG) is defined as equation (4), and the SG no-slip condition is defined as equation (5).

$$Slip_{SG} = |F_F|/\mu_{SG} N_G \tag{4}$$

$$SG_{ns} = 0 \leq Slip_{SG} < 1 \tag{5}$$

The MCBD no-slip condition, which accounts for both OS and SG slip, is then defined as equation (6).

$$MCBD_{ns} = OS_{ns} \wedge SG_{ns} \tag{6}$$

$$OS_{ns}, SG_{ns}, MCBD_{ns} \in \{0,1\} \tau_{Ol} = \tau_{Or} \tag{7}$$

Equations A.1-A.12 were solved simultaneously using the boldface variables in Table 1 as unknown variables and equation (7) as an assumption. The OS, SG, and MCBD slip functions were then calculated using the solutions for these variables.

The magnetic coupling force $F_M$ is an internal force between the spherical wheel, the Omni-wheels, and the yoke. Consequently, $F_F$ and $N_G$, equations (8) and (9) respectively, are not affected by $F_M$. The $Slip_{SG}$ function (10) is therefore also independent of $F_M$ and has a similar form to the $Slip_{SG}$ functions of existing ball drives with external support structures. The $Slip_{SG}$ function shows that an increase in the tangential platform load $F_P$, inclination angle $\beta$, or angular acceleration $-\ddot{\theta}_S$ (i.e., $r_o \ddot{\theta}_o / r_s$) can all contribute to increasing the numerator of the function, which can cause a violation of the no-slip condition which would result in ground slip.

$$F_F = F_p + M(g\,\sin(\beta) - r_S \alpha) \tag{8}$$

Where:

$$M = 2m_o + m_s + m_r$$

$$N_G = M\,g\,\cos(\beta) \tag{9}$$

$$Slip_{SG} = \frac{|F_p + M(g\,\sin(\beta) - r_S \alpha)|}{\mu_{SG} M\,g\,\cos(\beta)} \tag{10}$$

Equation (11) shows the solutions for $F_{Tl}$ and $F_{Tr}$, while equations (12) and (13) show the solutions for $N_{Ol}$ and $N_{Or}$. The solutions for $Slip_{OSl}$ and $Slip_{OSr}$ functions are shown in equations (14) and (15).

$$F_{Ti} = F_{Tr} = [M(g\,r_S \sin(\beta) - r_S^2 \alpha) + F_p r_S + I_S \alpha]/2r_S \tag{11}$$

$$N_{Oi} = \frac{-A}{4r_S \cos(\varphi_O) \sin(\varphi_O)} \tag{12}$$

$$N_{Or} = \frac{A}{4r_S \cos(\varphi_O) \sin(\varphi_O)} \tag{13}$$

Where:

$$A = a_1 \sin(\varphi_O)^2 + a_2 \sin(\varphi_O) - a_3 r_S \cos(\varphi_O)$$

$$a_1 = [2F_p r_S + (4m_o + 2m_s + 2m_r)(g r_S \sin(\beta) - r_S^2 \alpha) + 2I_s \alpha]$$

$$a_2 = [2F_p r_S + (4m_o + m_r)(g\,r_S \sin(\beta) - r_S^2 \alpha)]$$

$$a_3 = [F_M + (gm_o + gm_r)\cos(\beta)]$$

$$Slip_{OSi} = \frac{[M(g\,r_S \sin(\beta) - r_S^2 \alpha) + F_p r_S + I_S \alpha]/2r_S}{-\mu_{OS} A/4r_S \cos(\varphi_O) \sin(\varphi_O)} \tag{14}$$

$$Slip_{OSr} = \frac{[M(g\,r_S \sin(\beta) - r_S^2 \alpha) + F_p r_S + I_S \alpha]/2r_S}{-\mu_{OS} A/4r_S \cos(\varphi_O) \sin(\varphi_O)} \tag{15}$$

The slip functions for contact between the Omni-wheels and the spherical wheel are a little more challenging to decipher. As expected, FM is present in the solutions for both NOl and NOr as part of the a3 coefficient. However, due to the large number of parameters in the OS slip functions, the relative impact of FM on the OS slip is not immediately apparent.

Stochastic methods were used to explore the MCBD design space and gain insights on the significance of the input features ($F_M$, $\beta$, $F_P$, $\alpha$, $m_\gamma$, $\mu_{OS}$, $\mu_{SG}$) on the output slip functions. A broad range was defined for each parameter, as shown in Table II, to enable exploration of a large design space.

TABLE II

PARAMETERS AND RANGE USED TO EXPLORE DESIGN SPACE

| Parameter | Variable | Min | Max | Units |
|---|---|---|---|---|
| X1 | $F_M$ | 0 | 600 | N |
| X2 | $\beta$ | $-\pi/8$ | $\pi/8$ | Radians |
| X3 | $F_P$ | 0 | 150 | N |
| X4 | $\alpha$ | $-0.1/r_s$ | $-5/r_s|$ | Radians/s² |
| X5 | $m_\gamma$ | 5 | 25 | Kg |
| X6 | $\mu_{OS}$ | 0.4 | 1.4 | — |
| X7 | $\mu_{SG}$ | 0.4 | 1.1 | — |

The remaining parameters in the slip equations were defined as constants, as shown in Table III below.

TABLE III

CONSTANTS USED FOR EXPLORATION OF DESIGN SPACE

| $r_o$ (m) | $r_s$ (m) | $m_o$ (Kg) | $m_s$ (Kg) | $l_o$ (Kg·m²) | $l_s$ (Kg·m²) | $\varphi_o$ (rad) |
|---|---|---|---|---|---|---|
| 0254 | 0.1016 | 0.0254 | 2.5 | 0.000387 | 0.0133 | $\pi/6$ |

The effects of $F_M$ and $F_P$ were first examined by sampling the design space using seven values of $F_M$ (at 100 N increments) for four values of $F_P$ (at 50 N increments). Ten thousand design instances were generated for each run (21 runs in total) by randomly sampling the other five parameters within the design space. For each run, the OS, SG and MCBD slip occurrence probabilities were calculated by measuring the percentage of instances where slip occurred.

Figure 5A:
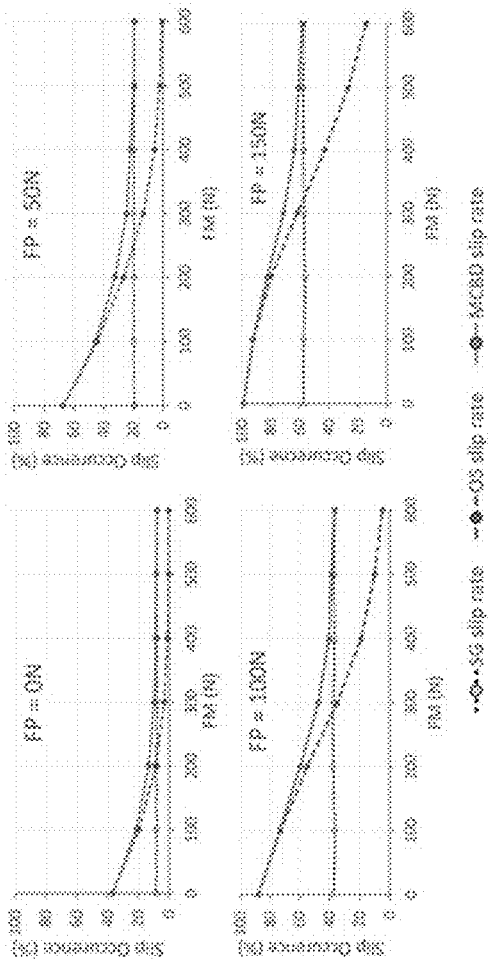
FIG. 5A shows a graph depicting slip occurrence probabilities for seven values of the magnetic coupling force (FM) and four values of the tangential platform load (FP) of a MCBD system.

FIG. 5A shows exemplary plots of the slip occurrence probabilities for each of the 21 runs. Numerous observations can be made from these plots. First, for $F_M=0$ N, the MCBD slip occurrence probability is equal to the OS slip occurrence probability and is much higher than the SG slip occurrence probability for all values of $F_P$, showing that without any magnetic coupling force, the OS contact will always slip before the SG contact. As $F_M$ is increased from 0 N to 600 N, the OS slip occurrence probability decreases and converges towards 0% while the SG slip occurrence probability, which is not affected by FM, remains constant. The MCBD slip occurrence probability, which accounts for both OS and SG slip, also decreased with FM, but converges to the SG slip occurrence percentage rather than 0%. Additionally, the probability for the slip increases with an increase in FP, which is a force that resists motion along the tangential direction.

MCBD slip is influenced more by OS slip for lower values of FM and higher values of FP, and by the SG slip for higher values of FM and lower values of FP. The OS slip occurrence probability can be reduced to 0% by applying large values of $F_M$, however, there is a diminishing rate of return on the reduction of the MCBD slip occurrence probability for larger values of $F_M$ since the MCBD slip is influenced more by SG slip, which is independent of $F_M$, in this region.

Figure 5B:
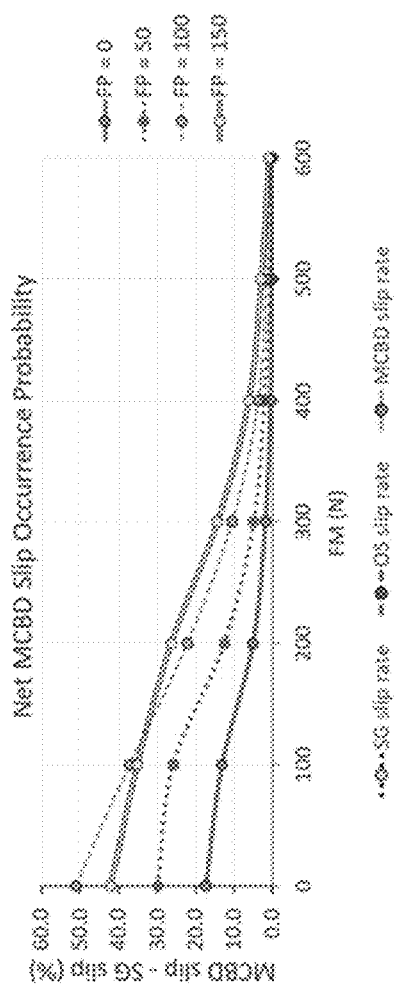
FIG. 5B shows a graph depicting net slip occurrence probability for seven values of the magnetic coupling force (FM) and four values of the tangential platform load (FP) of a MCBD system.

In FIG. 5B, SG slip instances are subtracted from the MCBD slip occurrence probability calculation to show the net MCBD slip occurrence probability that results from just OS slip occurrences. The best slip performance that can be achieved by the MCBD is when the MCBD slip occurrence corresponds with the SG slip occurrence (i.e., net MCBD slip occurrence probability=0%). FIG. 5B therefore shows the gain in slip reduction performance for increasing values of FM.

A support vector machine (SVM) based classifier was used to determine suitable ranges for $F_M$, $\beta$, $F_P$, $\alpha$, $m_\gamma$, $\mu_{OS}$, and $\mu_{SG}$ as well as to understand the importance of each of the seven parameters. The SVM classifier was trained on the dataset using MCBD slip as a binary label. The hyperparameters of the classifier with Linear Kernel (hyper-parameter C), and RBF kernels (hyper-parameters C and γ) were optimized using an exhaustive search and a dataset with 5000 instances. The values explored for C were {1,10,100, 1000} and gamma were {0.001,0.0001}. A total of 16 combinations of the hyper-parameters were selected and the precision efficiency (defined as the number of true positives divided by the number of true positives plus the number of false positives) and recall efficiency (defined as the number of true positives divided by the sum of the number of true positives and the number of false negatives) were computed. The best kernel and parameter set was adopted for training. The search was performed using a subset of the training data (1000 and 5000 points). The 'RBF' Kernel with C=1000 and gamma=0.001 emerged as the best performer with 84% precision and 88% recall for False and 87% precision and 82% recall efficiency for True prediction.

A dataset with 100,000 training instances was then generated and used for training the classifier. Following performance tuning and establishment of the best hyper-parameters, full training was done using the 100,000 data set with 80%-20% cross-validation (train-test split). Five-Fold cross-validation was performed using a sliding window. The SVM classifier with the selected RBF kernel and with 100,000 training points was able to achieve an average prediction accuracy of 92.4% (recall accuracy 0.912+/−0.009).

Figure 6:
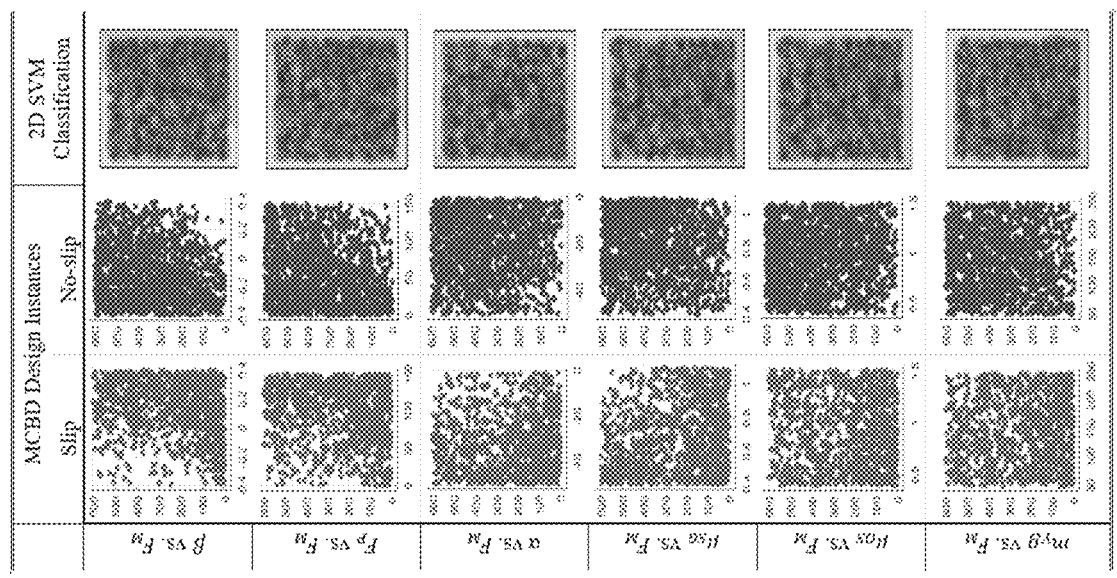
FIG. 6 shows downsampled plots of one hundred thousand data sets showing slip (left plot) and no-slip (middle plot) instances along with a 2D SVM classification (right plot) of six design parameters vs. $F_M$.

Plots of the MCBD slip/no-slip instances from the 100, 000 data set are shown in FIG. 6 along with a 2D SVM classification for $\beta$, $F_P$, $\alpha$, $\mu_{SG}$, $\mu_{OS}$, and $m_\gamma g$ plotted against $F_M$ (the 100K data points in the slip/no-slip plots have been downsampled for better visualization). While clustering of the slip and no-slip instance are evident from the plots of the data set, the SVM classification is able to generate a decision boundary that can be used to more clearly define the slip and no-slip regions. The classification results show that changes in $F_M$, $\beta$, $F_P$, $\alpha$, $\mu_{SG}$, and $\mu_{OS}$ all had an impact on the decision boundary. Surprisingly though, changes in $m_\gamma g$ had minimal impact on the decision boundary for MCBD slip. Examining the slip functions in (10), (14), and (15) more closely shows that the term $m_\gamma g$ appears in both the numerator and the denominator for all of the slip functions and may therefore have a net neutral effect on slip (i.e., while an increase in the mass of the yoke will increase the normal forces at the contacts, it will also require greater traction and friction forces to accelerate the larger mass).

Figure 7:
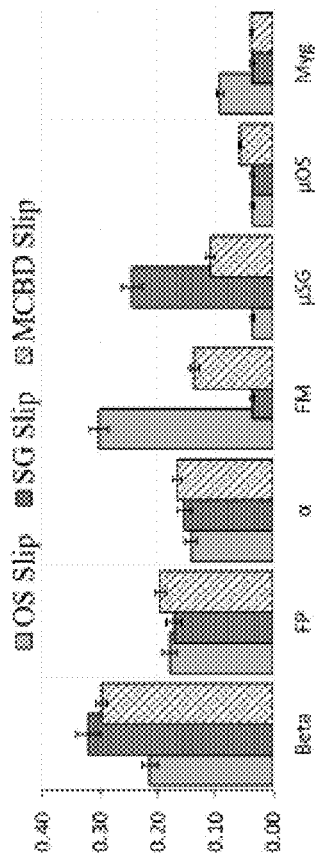
FIG. 7 shows a graph featuring importance scores for OS slip, SG slip, and MCBD slip functions.

Feature importance scores were also calculated for OS, SG, and MCBD slip using random forest decision trees, and are shown in FIG. 7. The feature importance scores show that while $F_M$ is the most crucial feature for OS slip; $\beta$, $F_P$, and a have higher importance than $F_M$ for MCBD slip. Since MCBD slip is influenced by both OS and SG slip, and SG slip is not affected by $F_M$, it is not surprising that $F_M$ has a lower importance score for MCBD slip. The results do however show that it is necessary to put limits on β, $F_P$, and α before determining an appropriate range for $F_M$ as these parameters have more impact on slip regardless of the $F_M$ values used.

The 2D SVM classification plots for β, $F_P$, and α in FIG. 6 show that all three parameters have instances that are in the red slip region even at the largest value of $F_M$ (600 N). Using the SVM decision boundaries in FIG. 6 as a guide the parameter ranges for β, $F_P$, and α were adjusted to the more appropriate values shown in Table IV.

TABLE IV

ADJUSTED PARAMETERS RANGES FOR β, $F_p$, AND α

| Parameter | Variable | Min | Max | Units |
|---|---|---|---|---|
| X2 | β | $-\pi/8$ | $\pi/16$ | Radians |
| X3 | $F_p$ | 0 | 100 | N |
| X4 | α | $-0.1/r_s$ | $-3/r_s$ | Radians/s$^2$ |

The maximum value for the adjusted β range is 11.25°. This value is still more than twice the maximum allowed slope for ADA compliant ramps (4.76°), which is likely to be the most challenging incline wheeled ground robots will experience in most indoor applications. Similarly, the maximum value for the adjusted α range corresponds to a linear acceleration of 3 m/s2. This value is equivalent to achieving human running speed from a standstill in under 1 second, which is more than sufficient acceleration for most indoor applications.

The original 100,000 dataset with the parameter ranges defined in Table II had an MCBD slip occurrence probability of 43%. By adjusting the β, $F_P$, and α parameters to the new ranges defined in Table V, the MCBD slip occurrence probability was reduced to 9.5% as, shown in Table V.

TABLE V

SLIP OCCURRENCE PROBABILITIES FOR ADJUSTED β, $F_p$, AND α PARAMETERS RANGES

| Parameter Range | Slip Occurrence probability | | |
|---|---|---|---|
| | SG | OS | MCBD |
| Original range | 29.5% | 31.4% | 43.1% |
| Adjusted β | 18.6% | 23.3% | 32.0% |
| Adjusted β & $F_p$ | 10.8% | 14.3% | 20.5% |
| Adjusted β, $F_p$, & α | 4.2% | 6.6% | 9.5% |

Figure 8:
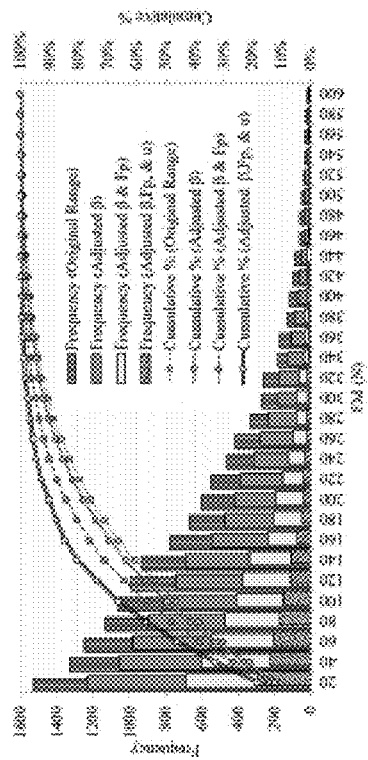
FIG. 8 shows a histogram of FM values of a MCBD system for OS slip=1 and SG slip=0.

To select a suitable $F_M$ range, the MCBD slip instances that were caused by only OS slip instances were evaluated separately. Histograms of the $F_M$ values for these instances are shown in FIG. 8. For the original parameter range, over 95% of the slip instances occur for $F_M$<365 N and only 1% of the slip instances occur for $F_M$>500 N. For the adjusted β, $F_P$, and α ranges, over 95% of the slip instances occur when $F_M$<250 N and only 1% of the slip instances occur when $F_M$>350 N.

An $F_M$ range of 250 N-350 N was therefore used as the target for the magnetic coupler. The OS, SG, and MCBD slip occurrence probabilities for the adjusted β, $F_P$, α, and $F_M$ ranges are 1.7%, 4.0% and 5.3% respectively.

Magnetic Coupler Design

In some embodiments, the MCBD system 100 includes a pair of permanent magnets 112, mounted therein, as described above and depicted in FIG. 3. The permanent magnets 112, in some embodiments, act as a magnetic coupler. In the embodiment of FIG. 3, the permanent magnets 112 are cylindrical magnets. Cylindrical magnets allow for a closer minimum coupling distance than, for example, rectangular shaped magnets of the same width. Coupling force decreases significantly with distance, as shown by analytical solutions for calculating forces between two cylindrical magnets/coils. In other embodiments, the permanent magnets can be any shape such as, for example, rectangular, ellipsoid, etc.

Figure 9:
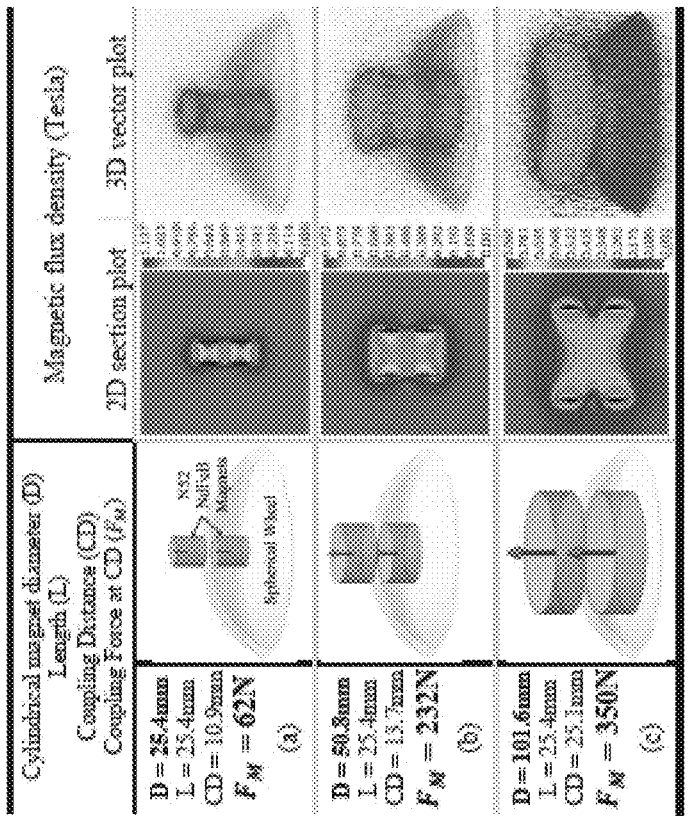
FIG. 9 shows magnetostatic simulation results of a design study performed to determine the size of cylindrical magnets required to achieve a FM=350 N.

Magnetostatic FEM simulations were used to determine the diameter required to achieve the target maximum coupling force of 350 N. The design study, in this embodiment, was performed for a pair of 25.4 mm long cylindrical N52 NdFeB (Neodymium) magnets. In this embodiment 7.62 mm thick spherical shell with an outer diameter of 232 mm and magnetic permeability of Silicone rubber is placed between the magnet pair to simulate the spherical wheel. FIG. 9 shows the simulation results for three magnet diameters.

In this embodiment, a small air gap of 1.27 mm was maintained between the surfaces of the cylindrical magnets and the spherical wheel to ensure that they do not come in contact. As the diameter of the magnets is increased, the minimum coupling distance (CD) between the magnets must also increase to maintain this air gap. While the pull force of the magnets increases significantly with the diameter of the magnets it also decreases exponentially with distance; therefore, most of the gain in the magnetic force of the larger diameter magnets is lost by the fact that a larger coupling distance is also needed for these larger diameter magnets.

The results from the simulations show that using a pair of N52 NdFeB cylindrical magnets with a diameter of 101.6 mm achieved the desired maximum coupling force of 350 N. However, a magnet of that size would be difficult, and dangerous, to handle manually and would also have a strong magnetic field that would extend out and influence ferromagnetic materials beyond the diameter of the spherical wheel, as illustrated by the magnetic flux density 3D vector plot shown in FIG. 9.

Figure 10:
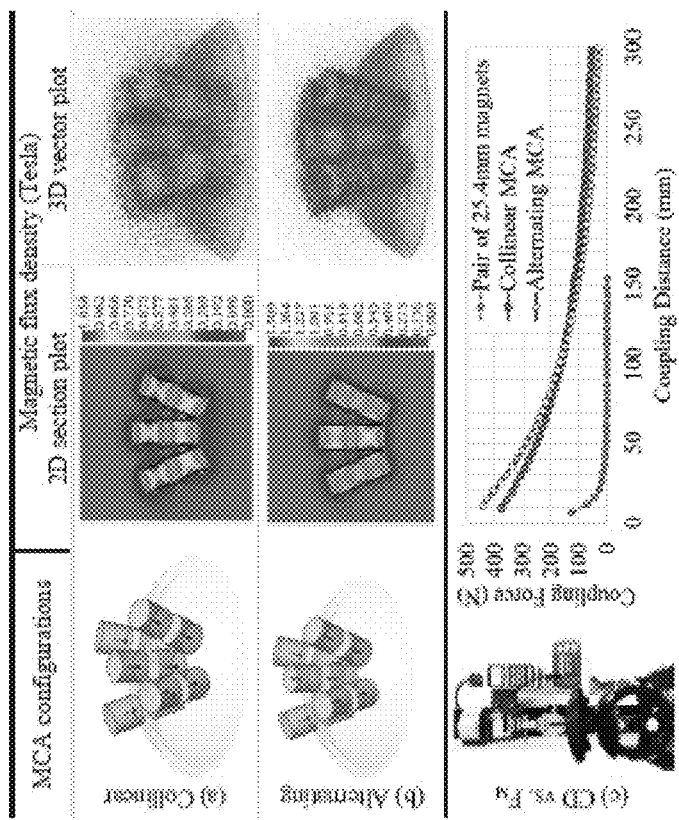
FIG. 10 shows magnetostatic simulation results for Collinear (a) and Alternating (b) MCA designs, along with experimental measurements of coupling distance vs. coupling force for a single pair of 25.4 magnets and both MCA designs (c)

In an embodiment, a magnetic coupler array (MCA) was pursued as an alternative to the magnetic coupler. An MCA uses an array of smaller magnets that would be more practical for use in real applications (i.e., easier to handle manually, less expensive, and have a more compact magnetic field). A 25.4 mm diameter magnet, shown in FIG. 10, was selected for use in the design of the MCA, as it had a compact magnetic field and a coupling distance of 10.9 mm, which was very close to the minimum achievable coupling distance of 10.2 mm.

Figure 11A:
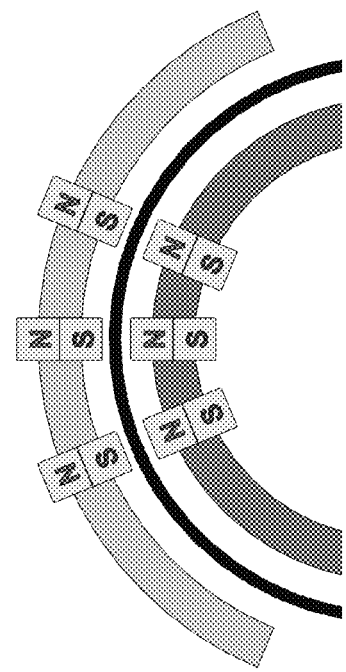
FIG. 11A shows a schematic illustration of a Collinear MCA, according to some embodiments of the present disclosure.
Figure 11B:
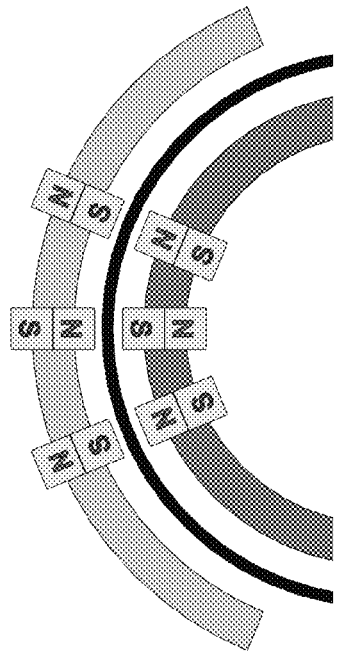
FIG. 11B shows a schematic illustration of an alternating MCA, according to some embodiments of the present disclosure.
Figure 11C:
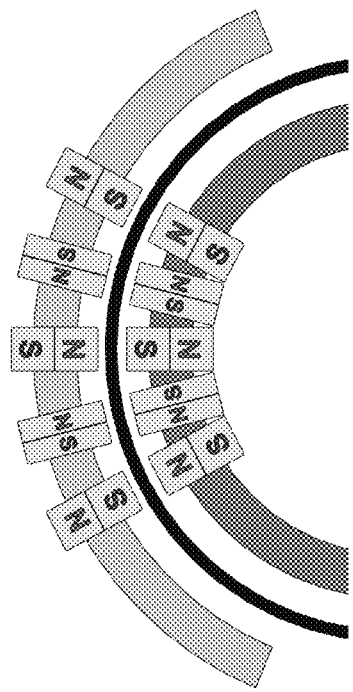
FIG. 11C shows a schematic illustration of a Halbach MCA, according to some embodiments of the present disclosure.
Figure 19:
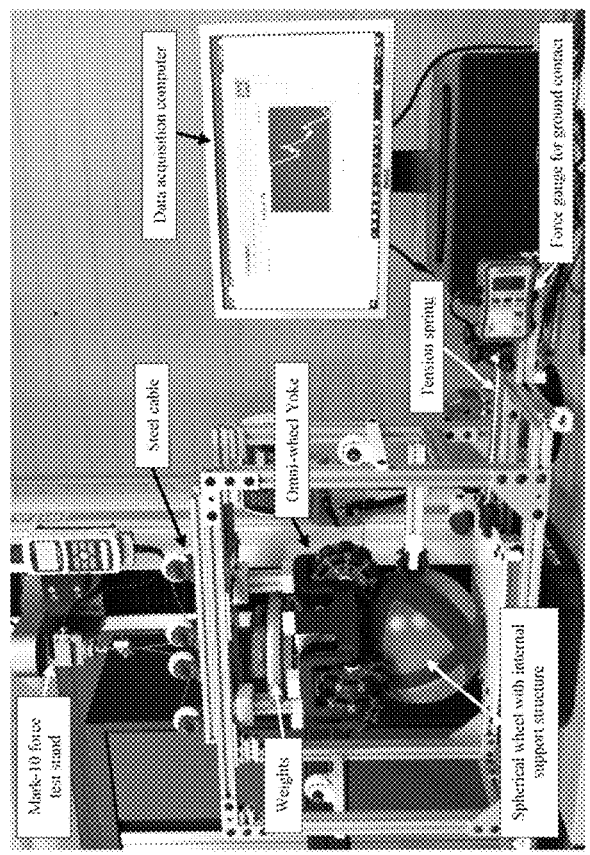
FIG. 19 shows a perspective view of an experimental MCBD prototype setup, according to some embodiments of the present disclosure.
Figure 18:
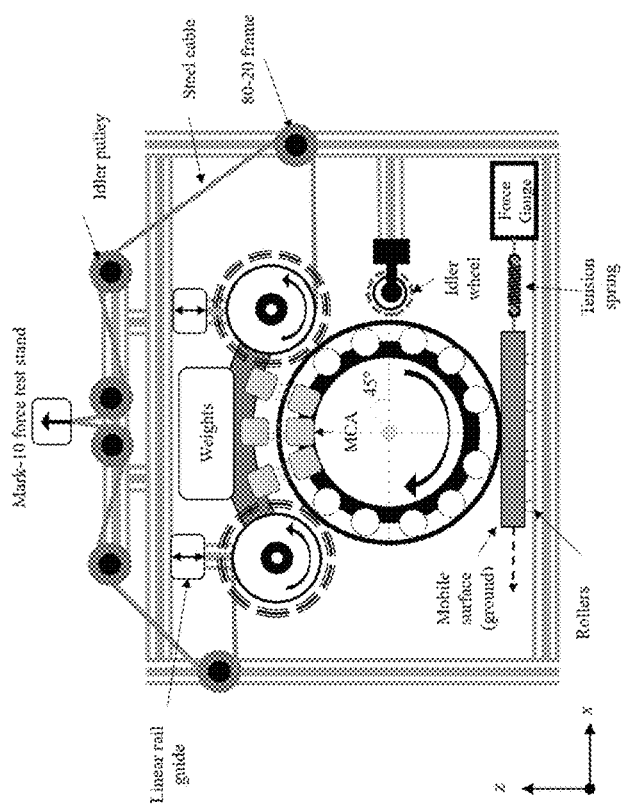
FIG. 18 shows a schematic of an experimental MCBD setup, according to some embodiments of the present disclosure.

In exemplary embodiments, two MCA designs that utilized five pairs of the 25.4 mm magnets were designed and tested. The first was an exemplary collinear MCA design where four additional pairs of magnets were uniformly patterned around the central pair at an angle of 22.5° from the vertical axis, as shown in FIGS. 10a and 11a. The second was an exemplary alternating MCA design which had a similar layout with the exception that the central magnet pair had an opposite magnetic polarity to the four surrounding pairs of magnets, as shown in FIGS. 10b and 11b. The alternating MCA design aims to focus and contain the magnetic field lines towards the center of the array. FIG. 11c depicts an alternate Halbach MCA design which can further focus and contain the magnetic field towards the center of the array.

The relationship between the coupling distance and the coupling force for the collinear and Alternating arrays was tested experimentally using a Mark-10 ESM 1500 test stand. The results from the tests are plotted in FIG. 10c. In an embodiment, 25.4 mm diameter magnet pair, depicted in FIG. 9a, was also tested and plotted in FIG. 10c for comparison. At the minimum coupling distance of 10.9 mm, the alternating MCA design was able to achieve a coupling force of 442 N while the collinear MCA design was able to achieve a lower coupling force of 370 N. The coupling force for the alternating MCA design decreased at a faster rate than the collinear MCA design.

Both MCA designs were capable of achieving the target FM range of 250 N-350 N. The alternating MCA design was selected as a better choice for the MCBD concept as it has a more focused and compact magnetic field compared to the opposing MCA design. Equation (16) was generated using an exponential fit of the plot for the alternating MCA (R2=1) and was used to calculate the coupling distance required to achieve the desired value for $F_M$.

$$CD = \frac{ln(C_M/493.4)}{-0.0308}$$ (16)

Exemplary MCBD Prototype

FIGS. 12-17 depict an exemplary spherical wheel 106, according to some embodiments of the present disclosure. As discussed above, the spherical wheel 106 includes the internal support structure 108 and ball transfers 114, as depicted in FIG. 14. As described above, the spherical wheel 116, in some embodiments, also includes an alternating MCA housing 116, depicted in FIGS. 15-17. In some embodiments, the spherical wheel 106 includes three layers (not shown): an inner layer, a middle layer and an outer layer. In some embodiments, the three layers have varying hardness levels. For example, in some embodiments, the inner layer has a hardness level of Shore A 95 to Shore D 80. In some embodiment, the middle layer has a hardness level of Shore A 70 to Shore A 95. In some embodiments, the outer layer has a hardness level of Shore A 50 to Shore A 70. In other embodiments, the three layers have the same hardness level.

In some embodiments, the three layers have uniform thicknesses. For example, in some embodiments, the three layers each have a thickness of 2.54 mm. In other embodiments, the three layers have varying thicknesses. In some embodiments, the spherical wheel 106 with the internal support structure 108 is produced via Polyjet additive manufacturing (AM), as depicted in FIGS. 12-17. As Polyjet AM is a multi-material 3D printing process, in some embodiments, several digital materials may be utilized to construct the spherical wheel 106. In some embodiments, a rubber-like material with a high static friction coefficient is utilized for outer and middle layers of the spherical wheel 106. In some embodiments, a harder polypropylene-like material is used for the inner layer, in order to provide a surface with lower rolling resistance for the ball transfers mounted on the internal support structure and to allow for a higher load-bearing capacity for the spherical wheel.

In some embodiments, the internal support structure 108 is fabricated on a fused deposition modeling (FDM) 3D printer using Acrylonitrile butadiene styrene (ABS) material. In some embodiments, the internal support structure 100 is designed with cavities (not shown) for mounting the ball transfers and magnets. In some embodiments, the alternating MCA housing is 3D printed with an internal cavity that is filled with iron filing to visualize the magnetic field, as depicted in FIG. 16. In some embodiments, the ball transfers comprise, for example, Stainless Steel, Delrin Acetal, Aluminum, Glass, hard Rubber, Plastics or combinations thereof.

Experimental Evaluation of the MCBD Prototype

The performance gains of the MCBD concept were evaluated using an experimental setup designed to generate slip, identify the location of the slip occurrence, and measure the forces/torques that were required to generate the slip. The Mark-10 force test stand was used to apply a measurable torque to the Omni-wheels using a cable pulley system, while the spherical wheel was placed on top of a moveable surface that was connected to a force gauge using a tension spring. The drive torque applied by the Omni-wheels as well as the ground traction force applied by the spherical wheel is measured during the experiment.

Linear rail guides mounted on aluminum T-slot framing are used to constrain the motion of the Omni-wheel yoke in the x and y axes and allow for free motion in the z axis. Due to size limitations, a $\varphi_o$ angle of 45° is used for the experimental setup rather than the 30° angle used in the model-based evaluation of the MCBD concept in the previous section. Nine experiments were performed, as shown in Table VI, for three loading conditions (58 N, 102 N, and 146 N) and three values of $F_M$ (0 N, 75 N, and 300 N).

TABLE VI

TABLE OF EXPERIMENTS

| $m_y g$ \| $F_M$ | 58N | 102N | 146N |
|---|---|---|---|
| 0 N | Experiment 1 | Experiment 2 | Experiment 3 |
| 75 N | Experiment 4 | Experiment 5 | Experiment 6 |
| 300 N | Experiment 7 | Experiment 8 | Experiment 9 |

The $F_M$ values were set by adjusting the coupling distance between the magnet arrays. For $F_M$=0 N the magnets were removed from the yoke and replaced by non-magnetic material of similar weight.

The three loading conditions are used to evaluate the effect of load transfers on the ball drive during motion. The applied loads of 58 N, 102 N, and 146 N were the result of the combined mass of the yoke and the added weights, which were 5.9 Kg, 10.4 Kg, and 14.9 Kg, respectively. These weights correspond to low, nominal, and high loading conditions for the ball drive. Accounting for the 2.5 Kg mass of the spherical wheel with the internal support structure this corresponds to a total mass of 8.4 Kg, 12.9 Kg, and 17.4 Kg of the ball drive for the three loading conditions. For experiments 1-3 the magnets are removed from the MCA to show the performance of the ball drive with $F_M$=0 N. The prototype was tested with $F_M$ set to a low value of 75 N for experiments 4-6 and $F_M$ set to a high value of 300 N for experiments 7-9 to test the effects of adding magnetic coupling force on slip performance.

Figure 21:
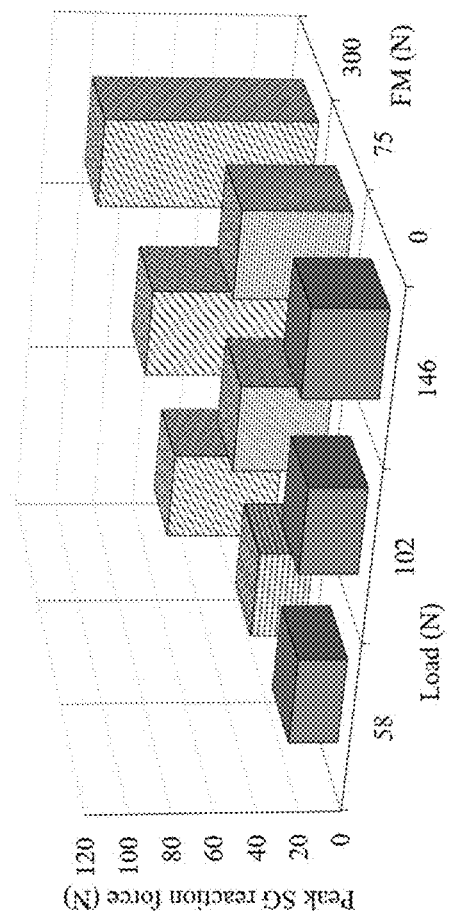
FIG. 21 shows a plot of peak measure ground reaction force for SG contact of an MCBD system, according to some embodiments of the present disclosure.
Figure 20:
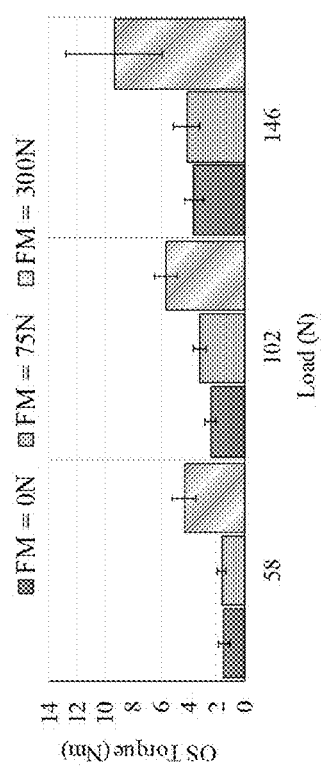
FIG. 20 shows a plot of average measure torque for OS contact of an MCBD system, according to some embodiments of the present disclosure.

The results for the experiments performed are shown in FIGS. 20 and 21 and are summarized in Table VII below. The plot in FIG. 20 shows the average torque measured at the OS contact (the error bars indicate the standard deviation of the measured torque; variability in the applied OS torque was observed as the individual rollers of the Omni-wheels engaged and disengaged the spherical wheel). FIG. 21 shows the plot of the peak ground reaction force measured by the force gauge for the SG contact. The values for the OS torque and the peak SG force measured for the nine experiments along with the location of the slip occurrence and the corresponding maximum achievable acceleration of the ball drive is shown in Table VII. The acceleration is calculated using the equation a=f/m, where f is the SG reaction force, and m is the total mass of the ball drive.

TABLE VII

SUMMARY OF EXPERIMENTAL RESULTS

| Exp. # | OS Torque (Nm) | Peak SG reaction force (N) | Slip Location | Maximum Acceleration (m/s²) |
|---|---|---|---|---|
| 1 | 1.47 (±0.41) | 23.2 | OS | 2.76 |
| 2 | 2.44 (±0.44) | 27.6 | OS | 2.14 |
| 3 | 3.64 (±0.68) | 35.6 | OS | 2.05 |
| 4 | 1.63 (±0.28) | 26.4 | OS | 3.14 |
| 5 | 3.21 (±0.44) | 43.6 | OS | 3.38 |
| 6 | 4.31 (±0.94) | 51.8 | OS | 2.98 |
| 7 | 4.31 (±0.82) | 53.8 | SG | 6.4 |
| 8 | 5.66 (±0.81) | 72.4 | SG | 5.6 |
| 9 | 9.32 (±3.47) | 102.6 | OS | 5.9 |

The results for experiments 1-3 show that in the absence of magnetic coupling force, slip occurs at the OS contact for all three loading conditions tested. While an increase in the OS torque and SG ground reaction force was observed with the increase in the applied load, there was a slight decrease in the corresponding maximum acceleration that was calculated for experiments 1-3. This decrease agrees with the SVM classification results which showed a flat/slightly decreasing decision boundary for $m_y g$ in FIG. 6. The results from experiments 1-3 were used as a baseline for evaluating the results for Experiments 4-9.

For experiments 4-6 ($F_M$=75 N) slip was also observed at the OS contact for all three loading conditions; however, a significant increase in both the OS torque and the peak SG reaction force was measured when compared to experiments 1-3. For example, at the nominal loading condition of 102 N, a 31.6% increase in OS torque and a 58% increase in the SG ground reaction force was measured. While the occurrence of OS slip indicates that that the ball drive was not able to fully utilize the traction forces available at the SG contact, the substantial increase in the achievable maximum acceleration between experiments 1-3 and experiments 4-6 show that significant gains in the performance of the ball drive can be attained even using a relatively low magnetic coupling force.

SG slip was first observed during experiment 7 when FM was set to 300 N. The occurrence of ground slip indicates that the ball drive is fully utilizing all of the available traction forces at the SG contact for the given loading condition. SG slip was also observed for experiment 8. At the nominal load of 102 N and $F_M$=300 N, a 132% increase in OS torque and a 162% increase in SG ground reaction force was measured. This corresponds to an acceleration gain of over 3.46 m/s² between experiment 2 and experiment 8. These results show that for the target $F_M$ range of 250 N-350 N, it is possible to achieve sizeable gains in slip performance using the MCBD concept.

SG slip was not observed for experiment 9, which had a high loading condition of 146 N along with $F_M$=300 N. The static coefficient of friction for the SG contact was calculated to be −0.61 based on the peak ground reaction force measured for experiments 7 and 8. Using this value for μSG, and accounting for the 17.4 Kg mass of the ball drive, a traction force of approximately 104 N would have been required to generate SG slip for experiment 9. A load of 102.6 N was generated during the experiment before OS slip occurred which shows that even for the high loading condition the ball drive was very close to fully utilizing the available traction force at the SG contact.

The MCBD's ability to apply and adjust FM enables it to control the slip location, the OS torque, the SG force, and the maximum acceleration/deceleration that can be achieved during motion. Utilizing an on-off control system that can adjust $F_M$ between a low and a high value (i.e., 75 N and 300 N) based on an acceleration threshold (i.e., 3 m/s²) it is possible to improve the performance and agility of ball-driven mobility platforms significantly. A sophisticated and well-instrumented MCBD implementation can further optimize performance by utilizing an active real-time control system to proportionally adjust $F_M$ based on the OS torque required and the operating conditions/environment of the ball drive.

Figure 22:
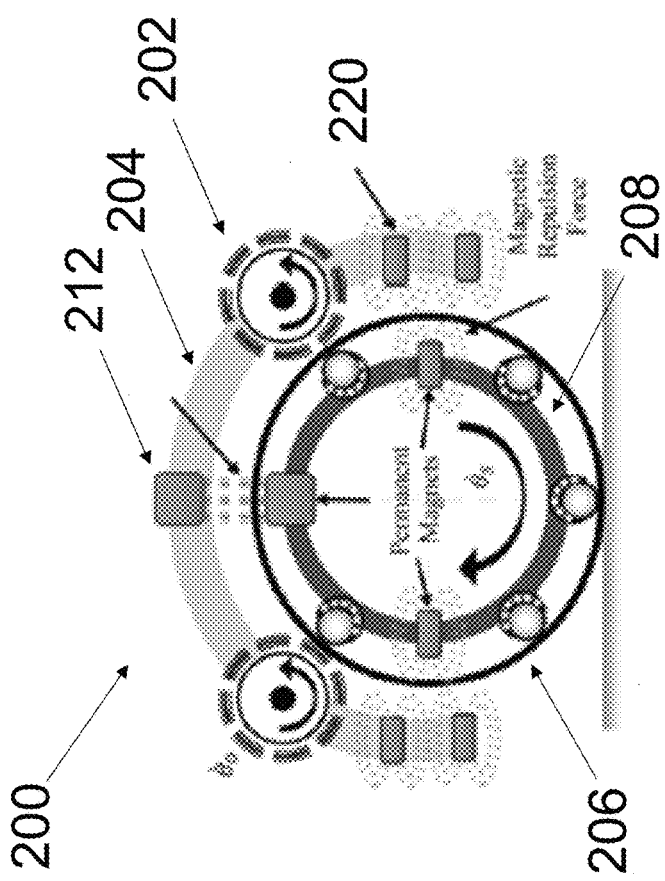
FIG. 22 shows a schematic view of an MCBD system, according to some embodiments of the present disclosure.

FIG. 22 depicts an MCBD system 200, according to another embodiment of the present disclosure. The MCBD system 200 is substantially similar to the MCBD system 100, including Omni-wheels 202, an external yoke 204, a spherical wheel 206, an internal support structure 208 and permanent magnets 212. However, the MCBD system 200 uses both attractive and repulsive magnetic force. Specifically, in some embodiments, repulsive magnets 220 are placed along or below the equator of the spherical wheel to provide magnetic repulsion force between the internal support structure and the yoke. The repulsion magnets along the equator help to further keep the spherical wheel aligned to the drive systems and reduce the risk of decoupling when traversing over large obstacles.

Figure 23:
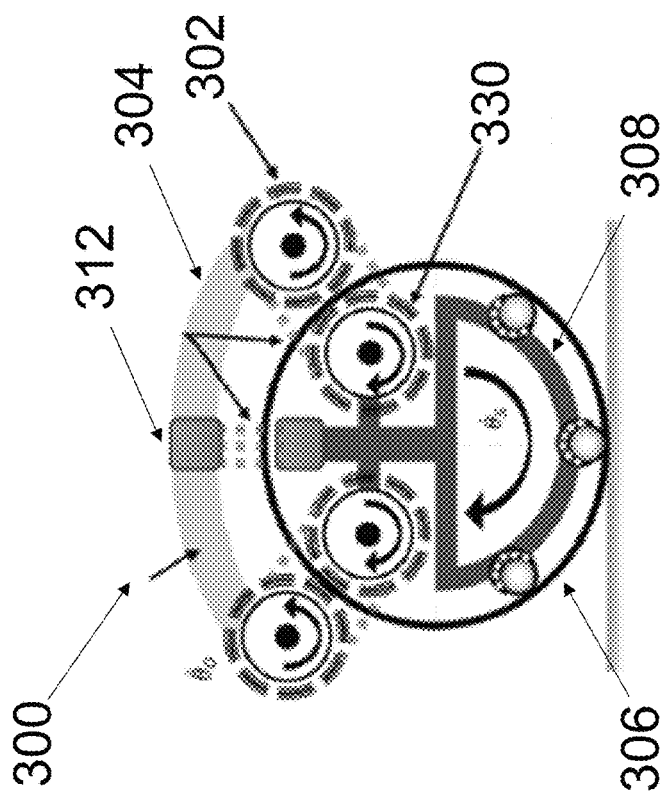
FIG. 23 shows a schematic view of an MCBD system, according to some embodiments of the present disclosure.

FIG. 23 depicts an MCBD system 300, according to another embodiment of the present disclosure. The MCBD system 300 is substantially similar to the MCBD system 100, including an external yoke 304, a spherical wheel 306, an internal support structure 308 and permanent magnets 312. However, in some embodiments, the MCBD system 300 includes both external Omni-wheels 302 and internal Omni-wheels 330. In some embodiments, the drive rollers of the internal and external omni-Wheel 302 and 303 are magnetically coupled and enable actuation of the spherical wheel 306 using both internal and external surfaces of the spherical wheel 306. In this embodiment internal and external magnetically coupled omni-wheels are used to apply actuation torque to both the internal and external surface of the spherical wheel. The surface of the spherical wheel is sandwiched between the two drive wheels, which enables the transmission of very large traction forces.

The internal support structure utilized in the MCBD concept has many advantages and can be implemented in a wide range of embodiments. Although exemplary embodiments of the MCBD system are presented herein, additional variations are also possible. It will be understood that the embodiments described hereinabove are merely exemplary and that a person skilled in the art may make many variations and modifications without departing from the spirit and scope of the present invention. It is appreciated that certain features of the disclosure, which are, for clarity, described in the context of separate embodiments, may also be provided in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not considered essential features of these embodiments, unless the embodiment is inoperative without those elements.

What is claimed is:

1. A ball drive system, comprising:
an external yoke;
a first pair of drive wheels mounted on the external yoke;
a spherical wheel comprising an internal support structure; and
a magnetic coupler coupling the internal support structure of the spherical wheel to the first pair of drive wheels via a controllable magnetic force,
wherein the first pair of drive wheels is configured to actuate the spherical wheel along a first degree of freedom.

2. The system of claim 1, further comprising a second pair of drive wheels mounted on the external yoke orthogonally to the first pair of drive wheels, wherein the second pair of drive wheels is configured to actuate the spherical wheel along a second degree of freedom.

3. The system of claim 1, wherein the magnetic coupler comprises at least one pair of permanent magnets, wherein a first magnet of the at least one pair of permanent magnets is positioned on the external yoke and a second magnet of the at least one pair of permanent magnets is positioned on the internal support structure.

4. The system of claim 3, wherein the magnetic coupler comprises Ferromagnetic materials.

5. The system of claim 1, wherein the magnetic coupler is a magnetic coupler array (MCA) comprising an array of magnets positioned on the external yoke and the internal support structure.

6. The system of claim 5, wherein the magnetic coupler is an alternating MCA.

7. The system of claim 5, wherein the magnetic coupler is a collinear MCA.

8. The system of claim 5, wherein the magnetic coupler is a Halbach MCA.

9. The system of claim 5, wherein the MCA is supplemented with electromagnets to control the controllable magnetic force.

10. The system of claim 5, wherein an air gap is maintained between the magnets of the array of magnets and the spherical wheel.

11. The system of claim 10, wherein the air gap is configured to be controlled to control the controllable magnetic force.

12. The system of claim 1, wherein the first pair of drive wheels are Omni-wheels.

13. The system of claim 1, wherein the internal support system comprises at least one cavity for mounting the at least one ball transfer.

14. The system of claim 1, wherein the internal support structure comprises Acrylonitrile butadiene styrene.

15. The system of claim 1, wherein the spherical wheel comprises an inner layer, a middle layer and an outer layer, each of the inner layer, the middle layer and the outer layer comprising a different hardness level.

16. The system of claim 1, wherein the internal support structure comprises at least one ball transfer.

17. The system of claim 16, wherein the at least one ball transfer comprises Stainless Steel.

18. The system of claim 1, further comprising a second pair of drive wheels positioned on the internal support system, wherein the second pair of drive wheels is magnetically coupled to the first pair of drive wheels.

19. The system of claim 18, wherein the second pair of drive wheels comprise Omni-wheels.

20. The system of claim 1, wherein the magnetic coupler comprises at least one pair of attractive magnets and at least one pair of repulsive magnets.

21. The system of claim 20, wherein the repulsive magnets are positioned along an equator of the spherical wheel.

* * * * *